United States Patent
Yeh et al.

(10) Patent No.: US 12,229,630 B2
(45) Date of Patent: Feb. 18, 2025

(54) READING METHOD AND READING DEVICE FOR TWO-DIMENSIONAL CODE

(71) Applicant: ASUSTeK COMPUTER INC., Taipei (TW)

(72) Inventors: Chin-Hao Yeh, Taipei (TW); Chin-Wen Lin, Taipei (TW); Hung-Yi Lin, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 101 days.

(21) Appl. No.: 17/986,914

(22) Filed: Nov. 15, 2022

(65) Prior Publication Data
US 2024/0070416 A1 Feb. 29, 2024

(30) Foreign Application Priority Data
Aug. 25, 2022 (TW) .................................. 111132039

(51) Int. Cl.
*G06K 7/14* (2006.01)
*G06K 19/06* (2006.01)

(52) U.S. Cl.
CPC ......... *G06K 7/1417* (2013.01); *G06K 7/1443* (2013.01); *G06K 7/146* (2013.01); *G06K 19/06037* (2013.01)

(58) Field of Classification Search
None
See application file for complete search history.

(56) References Cited

U.S. PATENT DOCUMENTS

2011/0290882 A1* 12/2011 Gu ....................... G06K 7/1456
235/462.11

FOREIGN PATENT DOCUMENTS

| CN | 104933387 | 5/2017 |
|----|-----------|--------|
| CN | 109753838 | 5/2019 |
| CN | 106682560 | 1/2020 |
| CN | 110084080 | 7/2021 |
| CN | 113076768 | 7/2021 |

* cited by examiner

*Primary Examiner* — Suezu Ellis
(74) *Attorney, Agent, or Firm* — JCIPRNET (57) ABSTRACT

A reading method and a reading device for a two-dimensional code. The method includes: capturing a two-dimensional code image through an image capturing device; detecting an outer frame and a position mark of a two-dimensional code in a skewed state in the two-dimensional code image; restoring the two-dimensional code in the skewed state to a default state; and performing a default operation according to the two-dimensional code in the default state.

18 Claims, 9 Drawing Sheets

READING METHOD AND READING DEVICE FOR TWO-DIMENSIONAL CODE

CROSS-REFERENCE TO RELATED APPLICATION

This application claims the priority benefit of Taiwan application serial No. 111132039, filed on Aug. 25, 2022. The entirety of the above-mentioned patent application is hereby incorporated by reference herein and made a part of this specification.

BACKGROUND

Technical Field

The disclosure relates to a reading method and a reading device for a two-dimensional code.

Description of Related Art

It has become more and more popular to use a two-dimensional code as an information transmission medium. In the conventional techniques for positioning a two-dimensional code, three or more position marks in the two-dimensional code are used to position the image of the two-dimensional code. However, as the number of position marks increases, the size of the area occupied by the position marks in the code layout of the two-dimensional code also increases. Moreover, the mainstream two-dimensional code technologies (e.g., QR codes) generally adopt code patterns in a square shape, which pose limitations in use. For example, when a square two-dimensional code is provided on a non-square medium, the rest of the layout area on the medium can no longer be used. As a result, the layout area may be wasted.

SUMMARY

According to the first aspect of this disclosure, a reading method for a two-dimensional code is provided. The method includes: capturing a two-dimensional code image by using an image capturing device, wherein the two-dimensional code image presents a two-dimensional code in a skewed state; detecting an outer frame and a position mark of the two-dimensional code in the skewed state in the two-dimensional code image; restoring the two-dimensional code in the skewed state to a default state in accordance with the outer frame and the position mark; and performing a default operation in accordance with the two-dimensional code in the default state.

According to the second aspect of this disclosure, a reading device for a two-dimensional code is provided. The reading device includes an image capturing device, a storage circuit, and a processor. The image capturing device is configured to capture a two-dimensional code image. The two-dimensional code image presents a two-dimensional code in a skewed state. The storage circuit is configured to store the two-dimensional code image. The processor is coupled to the image capturing device and the storage circuit. The processor is configured to: detect an outer frame and a position mark of the two-dimensional code in the skewed state in the two-dimensional code image; restore the two-dimensional code in the skewed state to a default state in accordance with the outer frame and the position mark; and perform a default operation in accordance with the two-dimensional code in the default state.

Based on the above, even if the two-dimensional code captured by the user is in a skewed state, the two-dimensional code may also be restored to the default state by using the outer frame and the position mark that hardly take up any space of the code layout area inside the two-dimensional code. Then, the default operation may be performed automatically in accordance with the two-dimensional code in the default state. Compared with the conventional coding/decoding techniques for two-dimensional codes, the reading method and the reading device for the two-dimensional code according to the embodiments of the disclosure are capable of effectively facilitating the efficiency in using the two-dimensional code.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
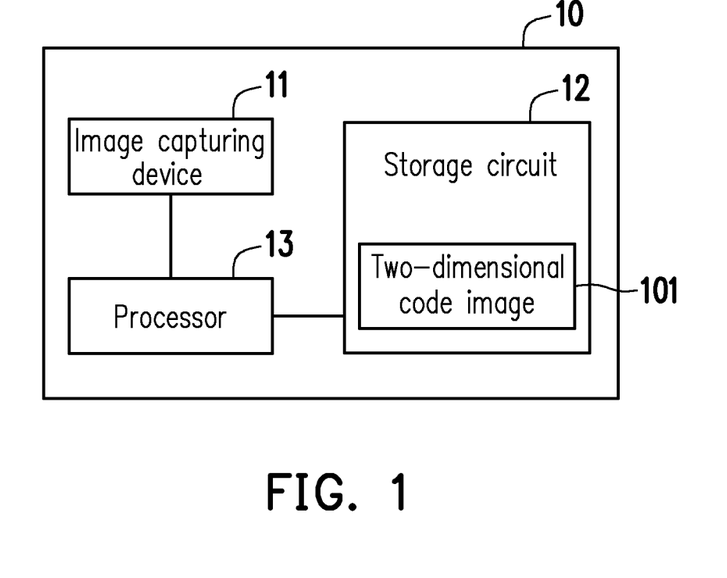
FIG. 1 is a schematic diagram illustrating a reading device for a two-dimensional code according to an embodiment of the disclosure.

Referring to FIG. 1, a reading device 10 for a two-dimensional code may be various electronic devices, such as a smartphone, a tablet computer, a laptop computer, an industrial computer, a server, a gaming console, a multimedia business machine, etc. In addition, the reading device 10 for the two-dimensional code is not limited to the above electronic devices.

The reading device 10 may include an image capturing device 11, a storage circuit 12, and a processor 13. The image capturing device 11 may capture an external image. Specifically, the external image may be a two-dimensional code image 101. For example, the image capturing device 11 may include an image sensor. The image sensor may include an optical lens element and a photo sensor. The image capturing device 11 may be built in the reading device 10 or may be connected to the reading device 10 through a line.

The storage circuit 12 is configured to store data. For example, the storage circuit 12 may include a volatile storage circuit and a non-volatile storage circuit. The volatile storage circuit is configured for volatile data storage. For example, a volatile storage circuit may include a random access memory (RAM) or a similar volatile storage medium. The non-volatile storage circuit is configured for non-volatile data storage. For example, a non-volatile storage circuit may include a read only memory (ROM), a solid state drive (SSD), a hard disk drive (HDD), a flash memory, an embedded multimedia card (eMMC), a universal flash storage (UFS) device, or a similar non-volatile storage medium.

The processor 13 is coupled to the image capturing device 11 and the storage circuit 12. The processor 13 may be configured to handle the entirety or a portion of the operation of the reading device 10. For example, the processor 13 may include a central processing unit (CPU) or other programmable general purpose or specific purpose microprocessors, a digital signal processor (DSP), a programmable controller, an application specific integrated circuit (ASIC), a programmable logic device (PLD), a similar device, or a combination of the devices.

The processor 13 may capture the two-dimensional code image 101 by using the image capturing device 11 and store the two-dimensional code image 101 in the storage circuit 12. The two-dimensional code image 101 may present a two-dimensional code. The two-dimensional code may serve to carry or present encoded information that is graphic (also referred to as graphic encoded information). For example, the two-dimensional code may be printed on a carrier, such as a piece of paper, or displayed on a display. The image capturing device 11 may obtain the two-dimensional code image 101 by scanning the two-dimensional code on the carrier or the display. In an embodiment, the two-dimensional code is also referred to as a graphic code.

In an embodiment, the two-dimensional code in the two-dimensional code image 101 is in a default state. For example, when the image capturing device 11 scans the two-dimensional code from a perspective of squarely facing the carrier or the display of the two-dimensional code, the two-dimensional code of the two-dimensional code image 101 captured by the image capturing device 11 may be in the default state. The processor 13 may analyze the two-dimensional code in the default state (e.g., decode the graphic encoded information in the two-dimensional code) to obtain the encoded information (i.e., the graphic encoded information) carried in the two-dimensional code. Then, the processor 13 may perform a corresponding operation (also referred to as a default operation) according to the encoded information. For example, in accordance with the encoded information obtained by analyzing the two-dimensional code, the processor 13 may start a browser application and present web page contents, etc., corresponding to a uniform resource locater (URL) by using the browser application. In addition, the processor 13 may also perform other types of operations in accordance with the encoded information obtained by analyzing the two-dimensional code, such as starting other types of applications. The disclosure is not particularly limited in this regard.

In an embodiment, the two-dimensional code in the two-dimensional code image 101 may also be in a skewed state. For example, when the image capturing device 11 scans the two-dimensional code from a perspective not squarely facing the carrier or the display of the two-dimensional code, the two-dimensional code of the two-dimensional code image 101 captured by the image capturing device 11 may be in the skewed state. For example, in the skewed state of the two-dimensional code, the graphic encoded information carried or presented by the two-dimensional code may at least be partially distorted. In such situation, the processor 13 is unable to perform the operation corresponding to the two-dimensional code directly in accordance with the two-dimensional code in the skewed state (or the distorted graphic encoded information) in the two-dimensional code image 101.

In an embodiment, the processor 13 may restore the two-dimensional code in the skewed state to the default state through image processing for the two-dimensional code in the skewed state in the two-dimensional code image 101 beforehand, so that the processor 13 may perform the corresponding operation in accordance with the two-dimensional code in the default state.

In an embodiment, the two-dimensional code in the two-dimensional code image 101 may include an outer frame and a position mark. That is, in a single two-dimensional code presented in the two-dimensional code image 101, the total number of each of the outer frame and the position mark may be one. However, the disclosure is not limited thereto. In an embodiment, the total numbers of the outer frame and the position mark in one two-dimensional code may be adjusted based on actual practice, and the disclosure is not particularly limited in this regard. The outer frame may serve to define the range or the boundary of the two-dimensional code presented in the two-dimensional code image 101. The position mark may serve to position the two-dimensional code presented in the two-dimensional code image 101.

In an embodiment, when the two-dimensional code in the two-dimensional code image 101 is in the default state, the outer frame in the two-dimensional code may have a default shape, and the position mark in the two-dimensional code is in a default position. For example, the default shape of the outer frame may be one of a circular shape, an odd-numbered regular polygonal shape, and an even-numbered regular polygonal shape, and the disclosure is not particularly limited in this regard. In addition, the position mark may include a round dot or other patterns. The disclosure is not particularly limited in this regard, either.

In an embodiment, when the two-dimensional code in the two-dimensional code image 101 is not in the default state (i.e., the two-dimensional code is in the skewed state), the shape of the outer frame and/or the position of the position mark in the two-dimensional code may be changed. Therefore, in the skewed state of the two-dimensional code, the outer frame of the two-dimensional code may not exhibit the default shape, and/or the position mark in the two-dimensional code may not be located at the default position. Therefore, in such case, the processor 13 may not be able to correctly identify the distorted graphic encoded information in the two-dimensional code.

In an embodiment, the two-dimensional code in the two-dimensional code image 101 is in the skewed state. The processor 13 may detect the outer frame and the position mark of the two-dimensional code in the skewed state in the two-dimensional code image 101. Then, the processor 13 may restore the two-dimensional code in the skewed state to the default state in accordance with the outer frame and the position mark. Then, the processor 13 may perform the default operation in accordance with the two-dimensional code in the default state.

In an embodiment, the processor 13 may perform a shape restoring operation on the two-dimensional code in the skewed state in the two-dimensional code image 101. The shape restoring operation may restore the deformed outer frame in the two-dimensional code, together with the two-dimensional code itself (including the graphic encoded information), to the default shape. For example, in the shape restoring operation, the processor 13 may obtain descriptive data relating to the shape of the outer frame in the skewed state. The processor 13 may obtain a rotation offset angle (also referred to as a first rotation offset angle) of the two-dimensional code in the skewed state relative to a coordinate axis (also referred to as a first coordinate axis) in accordance with the descriptive data. Then, the processor 13 may correct (i.e., restore) the two-dimensional code in accordance with the first rotation offset angle, so as to restore the outer frame of the two-dimensional code, together with the two-dimensional code itself, to the default shape.

In an embodiment, the descriptive data may serve to schematically depict the deformation of the outer frame in the skewed state. For example, the descriptive data may include a first reference value and a second reference value. In an embodiment, when the default shape of the outer frame is circular, the first reference value may correspond to a major axis length of the outer frame, and the second reference value may correspond to a minor axis length of the outer frame after the outer frame is deformed. In an embodiment, when the default shape of the outer frame is odd-numbered regular polygonal, the first reference value may correspond to a distance between a vertex of the outer frame and a side opposite to the vertex, and the second reference value may correspond to the length of the side after the outer frame is deformed. Alternatively, in an embodiment, when the default shape of the outer frame is even-numbered regular polygonal, the first reference value may correspond to a distance between a side (also referred to as a first side) of the outer frame and another side (also referred to a second side) opposite to the first side, and the second reference value may correspond to the length of the second side after the outer frame is deformed.

In an embodiment, the processor 13 may obtain the first rotation offset angle in accordance with a value ratio between the first reference value and the second reference value. The processor 13 may perform a matrix operation on pixel values corresponding to respective pixel positions in the two-dimensional code image 101 in accordance with a rotation matrix corresponding to the first rotation offset angle. Based on the operation result of the matrix operation, the processor 13 may restore the outer frame of the two-dimensional code in the skewed state, together with the two-dimensional code itself, to the default state.

In an embodiment, the processor 13 may perform an angle restoring operation on the two-dimensional code in the skewed state in the two-dimensional code image 101. The angle restoring operation may restore the position mark whose position is changed in the two-dimensional code to the default position. For example, in the angle restoring operation, the processor 13 may obtain a rotation offset angle (also referred to as a second rotation offset angle) of the two-dimensional code relative to a coordinate axis (also referred to as a second coordinate axis) in accordance with the position of the position mark in the two-dimensional code in the skewed state. Then, the processor 13 may correct (rotate, for example) the two-dimensional code in accordance with the second rotation offset angle to restore the position mark to the default position. For example, the processor 13 may perform a matrix operation on pixel values corresponding to the respective pixel positions in the two-dimensional code image 101 in accordance with a rotation matrix corresponding to the second rotation offset angle. Based on the operation result of the matrix operation, the processor 13 may restore the position mark of the two-dimensional code in the skewed state to the default position. It should be noted that the operation of restoring the position mark to the default position may be equivalent to restoring (rotating, for example) the two-dimensional code in the skewed state to a default angle state of the two-dimensional code.

In an embodiment, when the default shape of the outer frame of the two-dimensional code is odd-numbered regular polygonal or even-numbered regular polygonal, the processor 13 may, before performing the shape restoring operation on the two-dimensional code in the skewed state, perform a preliminary correction operation on the two-dimensional code to facilitate the efficiency of the shape restoring operation and/or angle restoring operation that are performed afterwards. In the preliminary correction operation, the processor 13 may rotate the two-dimensional code, so that a side of the outer frame of the two-dimensional code is parallel to the second coordinate axis.

According to an embodiment, in the preliminary correction operation, when the side of the outer frame of the two-dimensional code is parallel to the second coordinate axis, the processor 13 may further move at least a portion of the pattern of the two-dimensional code in a direction parallel to the second coordinate axis, so that a line connecting the side and a vertex of the outer frame is parallel to another coordinate axis (also referred to as a third coordinate axis). Such operation may facilitate the shape restoring operation and/or the angle restoring operation that are performed afterwards.

In the following, the correction of the two-dimensional code is described by using a two-dimensional code with a circular outer frame, a two-dimensional code with an odd-numbered regular polygonal outer frame, and a two-dimensional code with an even-numbered regular polygonal outer frame as examples. However, in other embodiments, the outer frame of the two-dimensional code may also have other shapes, and the disclosure is not particularly limited in this regard.

The following describes the correction of the two-dimensional code with a circular outer frame.

Figure 2A:
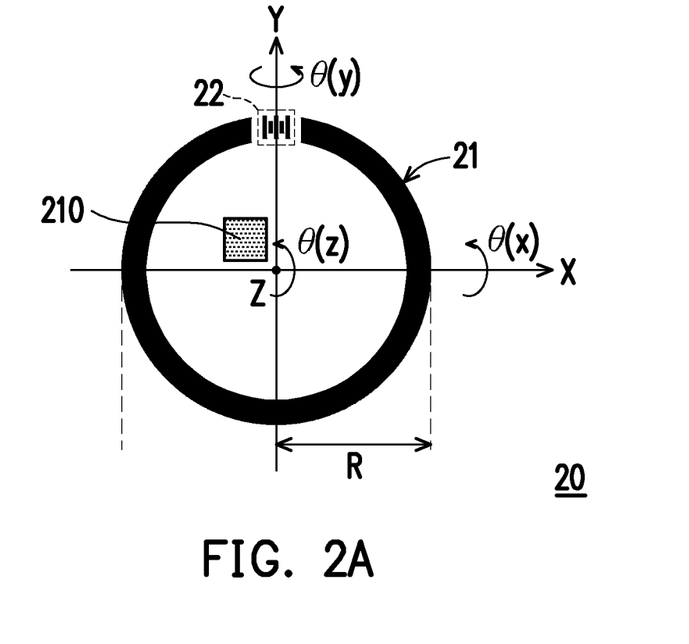
FIG. 2A is a schematic view illustrating a two-dimensional code in a default state according to an embodiment of the disclosure.

Referring to FIG. 2A, the two-dimensional code 20 has an outer frame 21 and a position mark 22. In the default state of the two-dimensional code 20, the default shape of the outer frame 21 is circular (the length of the radius thereof is R), and the default position of the position mark 22 is located on Y-axis in a three-dimensional space. It is noted that the size of the outer frame 21 and the default position of the position mark 22 may be adjusted based on practice, and the disclosure is not particularly limited in this regard. In addition, graphic encoded information 21 carried by the two-dimensional code 20 may be presented in a circular area surrounded by the outer frame 21, and the disclosure is not particularly limited by the default position of the graphic encoded information 210 in the two-dimensional code 20 and the contents of the graphic encoded information 210.

Figure 2B:
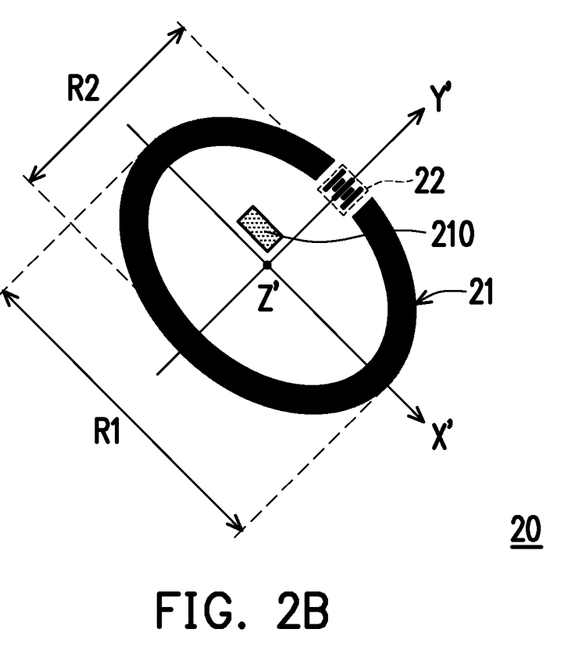
FIG. 2B is a schematic view illustrating the two-dimensional code in a skewed state according to an embodiment of the disclosure.

Referring to FIG. 2B, it is assumed that the two-dimensional code 20 is in the skewed state. For example, the two-dimensional code 20 in the skewed state in FIG. 2B may be obtained by rotating the two-dimensional code 20 in the default state as shown in FIG. 2A by a specific angle along at least one of X-axis, Y-axis, and Z-axis in the three-dimensional space. For example, by rotating the two-dimensional code 20 the default state as shown in FIG. 2A respectively by $\theta(x)$ degrees, $\theta(y)$ degrees, and $\theta(z)$ degrees using X-axis, Y-axis, and Z-axis in the three-dimensional space as rotation axes, the shape of the outer frame 21 of the two-dimensional code in the skewed state in FIG. 2B is changed from a circular shape (i.e., the default shape) into an elliptical shape, and the position of the position mark 22 is also changed. Here, $\theta(x)$ degrees, $\theta(y)$ degrees, and $\theta(z)$ degrees may respectively be arbitrary values from 0 to 360. In addition, the graphic encoded information 210 in FIG. 2B is also in a skewed and/or distorted state.

In an embodiment, the processor 13 may detect the outer frame 21 and the position mark 22 of the two-dimensional code 20 in the skewed state as shown in FIG. 2B. In accordance with the detected outer frame 21, the processor 13 may perform the shape restoring operation on the two-dimensional code 20 in the skewed state. For example, in the shape restoring operation, the processor 13 may obtain descriptive data relating to the shape of the outer frame 21 in the skewed state. For example, the descriptive data may include the first reference value and the second reference value. For example, the first reference value may correspond to a length R1 of the major axis of the elliptical shape exhibited in the outer frame 21, and the second reference value may correspond to a length R2 of the minor axis of the elliptical shape presented by the outer frame 21. In addition, the first reference value and the second reference value may schematically indicate the deformation of the outer frame 21 in the skewed state, such as a length ratio between the major axis and the minor axis of the outer frame 21 in the skewed state.

In an embodiment, the processor 13 may set a major axis direction and a minor axis direction exhibited in the outer frame 21 as a new X-axis (i.e., X'-axis) and a new Y-axis (i.e., Y'-axis), and a new Z-axis (i.e., Z'-axis) may be set at the center inside the outer frame 21, as shown in FIG. 2B. In accordance with the first reference value and the second reference value, the processor 13 may obtain the rotation offset angle (i.e., the first rotation offset angle) of the two-dimensional code 20 in the skewed state relative to X'-axis (i.e., the first coordinate axis). The first rotation offset angle may indicate the degrees by which the outer frame 21 in the circular shape in the default state is rotated using X'-axis as the rotation axis in the three-dimensional space to obtain the outer frame 21 in the elliptical shape as shown in FIG. 2B.

In an embodiment, the processor 13 may refer to a value ratio between the first reference value and the second reference value (i.e., the value ratio between the length R1 and the length R2) to obtain the first rotation offset angle through calculation or by using a lookup table. Then, the processor 13 may correct the two-dimensional code 20 in the skewed state in FIG. 2B by using a rotation matrix corresponding to the first rotation offset angle.

Figure 2C:
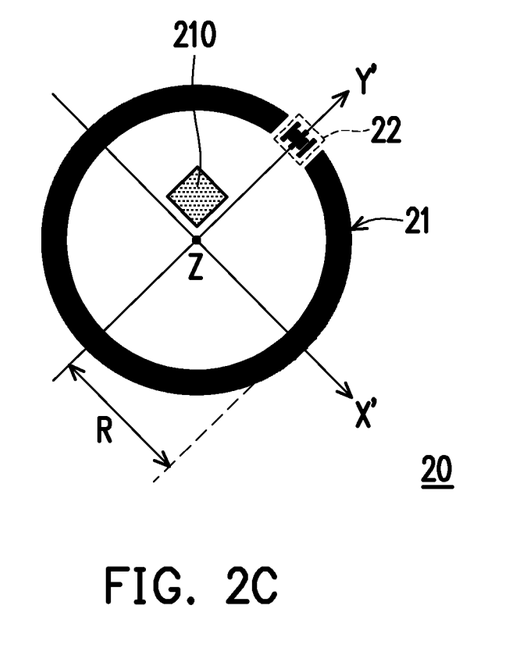
FIG. 2C is a schematic view illustrating correcting a two-dimensional code in the skewed state according to an embodiment of the disclosure.

Referring to FIG. 2C, after correcting the two-dimensional code 20 in the skewed state as shown in FIG. 2B in accordance with the rotation matrix corresponding to the first rotation offset angle, the outer frame 21 of the two-dimensional code 20, together with the two-dimensional code 20 itself (including the graphic encoded information 210), may be restored to the default shape (i.e., circular shape). Then, the processor 13 may perform the angle restoring operation on the two-dimensional code 20 that is still in the skewed state as shown in FIG. 2C. For example, in the angle restoring operation, the processor 13 may obtain a rotation offset angle (i.e., the second rotation offset angle) of the two-dimensional code 20 relative to Z'-axis (i.e., the second coordinate axis) in accordance with the position of the position mark 22 in the two-dimensional code 20. For example, the processor 13 may adopt phase correlation to obtain the second rotation offset angle in accordance with the position of the position mark 22 in the two-dimensional code 20. Then, the processor 13 may correct (e.g., rotate) the two-dimensional code 20 in accordance with a rotation matrix corresponding to the second rotation offset angle to restore the position mark 22 to the default position in FIG. 2A. It should be noted that the operation of restoring the position mark 22 to the default position may be equivalent to restoring (rotating, for example) the two-dimensional code 20 in the skewed state to the default angle state of the two-dimensional code 20, as shown in FIG. 2A. So far, the correction (or restoring) of the two-dimensional code 20 (including the graphic encoded information 210) with a circular outer frame is completed. In addition, the processor 13 as shown in FIG. 1 may analyze (e.g., decode) the graphic encoded information 210 carried or presented by the corrected two-dimensional code 20 and perform the default operation in accordance with the analysis result.

The following describes the correction of the two-dimensional code with an odd-numbered regular polygonal outer frame.

Figure 3A:
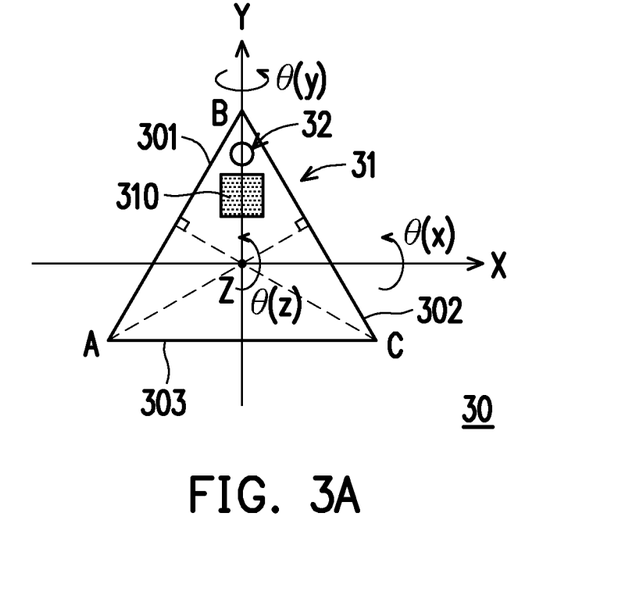
FIG. 3A is a schematic view illustrating a two-dimensional code in a default state according to an embodiment of the disclosure.

Referring to FIG. 3A, the two-dimensional code 30 has an outer frame 31 and a position mark 32. In the default state of the two-dimensional code 30, the default shape of the outer frame 31 is regular triangular, and the default position of the position mark 32 is located on Y-axis in a three-dimensional space. For example, the outer frame 31 may have sides 301 to 303 and vertexes A to C. The sides 301 to 303 form a regular triangle, and the vertexes A to C are respectively the three vertexes of the regular triangle. It should be noted that the default shape of the outer frame 31 may also be other odd-numbered regular polygonal shapes, and/or the default position of the position mark 32 may also be adjusted based on practice. The disclosure is not particularly limited in this regard. In addition, graphic encoded information 31 carried by the two-dimensional code 30 may be presented in a triangular area surrounded by the outer frame 31, and the disclosure is not particularly limited by the default position of the graphic encoded information 310 in the two-dimensional code 30 and the contents of the graphic encoded information 310.

Figure 3B:
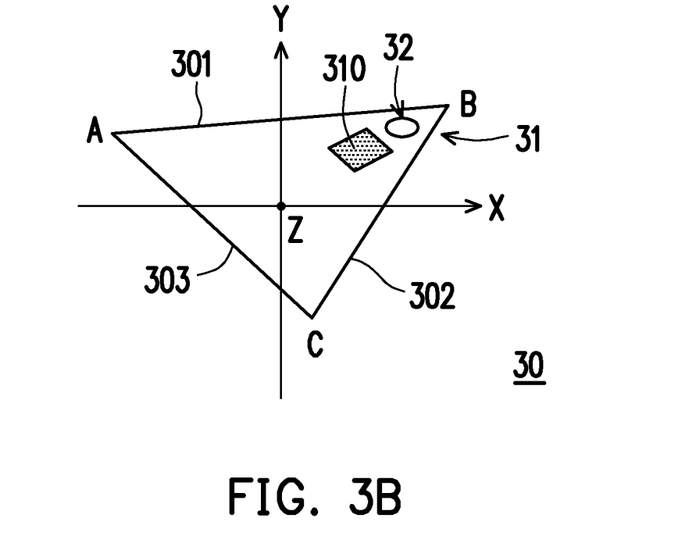
FIG. 3B is a schematic view illustrating the two-dimensional code in a skewed state according to an embodiment of the disclosure.

Referring to FIG. 3B, it is assumed that the two-dimensional code 30 is in the skewed state. For example, the two-dimensional code 30 in the skewed state as shown in FIG. 3B may be obtained by rotating the two-dimensional code 30 in the default state as shown in FIG. 3A by $\theta(x)$ degrees, $\theta(y)$ degrees, and $\theta(z)$ degrees using X-axis, Y-axis, and Z-axis in the three-dimensional space as the rotation axes. In addition, the graphic encoded information 310 in FIG. 3B is also in a skewed and/or distorted state.

Figure 3C:
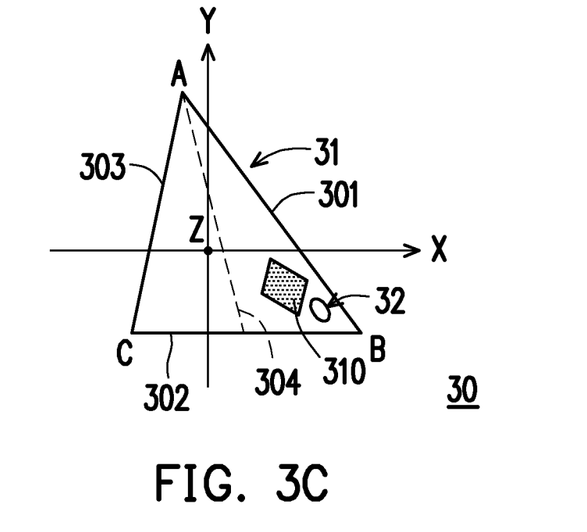
FIGS. 3C to 3F are schematic views illustrating correcting the two-dimensional code in the skewed state according to an embodiment of the disclosure.

In an embodiment, the processor 13 may detect the outer frame 31 and the position mark 32 of the two-dimensional code 30 in the skewed state as shown in FIG. 3B. In accordance with the detected outer frame 31, the processor 13 may perform the preliminary correction operation on the two-dimensional code 30 in the skewed state. In the preliminary correction operation, the processor 13 may rotate the two-dimensional code 30, so that the side 302 of the outer frame 31 of the two-dimensional code 30 is parallel to X-axis (i.e., the second coordinate axis), as shown in FIG. 3C. In addition, the processor 13 may obtain or establish a line 304 connecting the vertex A and the side 302.

Figure 3D:
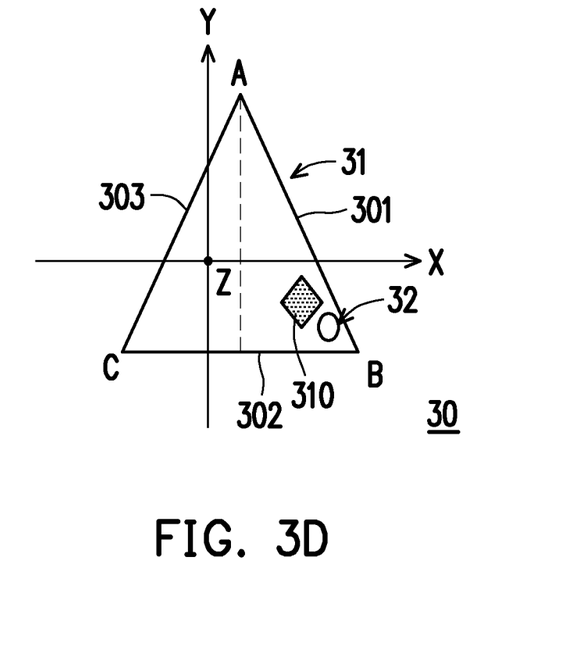

Referring to FIG. 3D following FIG. 3C, in the preliminary correction operation, the processor 13 may further move at least a portion of the pattern of the two-dimensional code 30 in a direction parallel to X-axis, so that the line 304 is parallel to Y-axis (i.e., the third coordinate axis). Then, the processor 13 may further move the entire two-dimensional code 30 in a direction parallel to X-axis, so that the line 304 is aligned to Y-axis (i.e., allowing the line 304 to coincide or be overlapped with Y-axis), as shown in FIG. 3E.

Figure 3E:
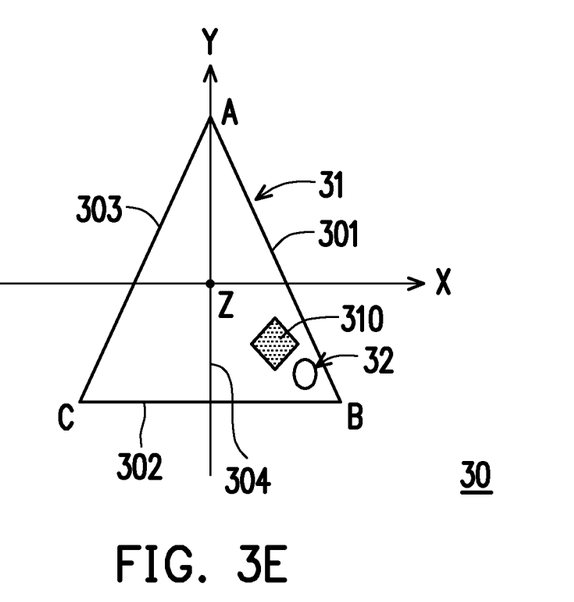

In FIG. 3E, the two-dimensional code 30 is still in the skewed state. For example, in FIG. 3E, the two-dimensional code 30 is an isosceles triangle, but not a regular triangle. Therefore, in FIG. 3E, the processor 13 may perform the shape restoring operation on the two-dimensional code 30 in the skewed state. For example, in the shape restoring operation, the processor 13 may obtain descriptive data relating to the shape of the outer frame 31 in the skewed state. For example, the descriptive data may include the first reference value and the second reference value. For example, the first reference value may correspond to the distance (i.e., the length of the line 304) between the vertex A and the side 302 opposite to the vertex A, and the second reference value may correspond to the length of the side 302. In addition, the first reference value and the second reference value may schematically indicate the deformation of the outer frame 31 in the skewed state. For example, the first reference value and the second reference value may indicate the schematic mode of the isosceles triangle presented when the outer frame 31 is in the skewed state.

In an embodiment, in accordance with the first reference value and the second reference value, the processor 13 may obtain the rotation offset angle (i.e., the first rotation offset angle) of the two-dimensional code 30 in the skewed state relative to X-axis (i.e., the first coordinate axis). The first rotation offset angle may indicate the degrees by which the outer frame 31 in the regular triangular shape in the default state as shown in FIG. 3A is rotated using X-axis as the rotation axis in the three-dimensional space to obtain the outer frame 31 in the isosceles triangular shape as shown in FIG. 3E.

In an embodiment, the processor 13 may refer to a value ratio between the first reference value and the second reference value (i.e., the value ratio between the length of the line 304 and the length of the side 302) to obtain the first rotation offset angle through calculation or by using a lookup table. Then, the processor 13 may correct the two-dimensional code 30 in the skewed state in FIG. 3E by using a rotation matrix corresponding to the first rotation offset angle.

Figure 3F:
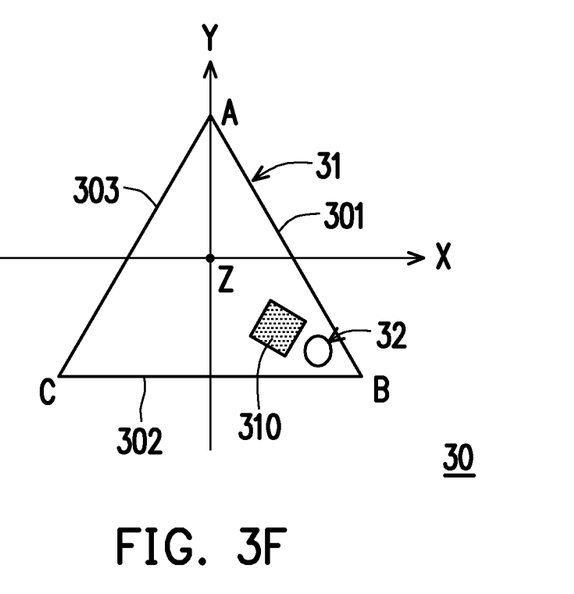

Referring to FIG. 3F, after correcting the two-dimensional code 30 in the skewed state as shown in FIG. 3E in accordance with the rotation matrix corresponding to the first rotation offset angle, the outer frame 31 of the two-dimensional code 30, together with the two-dimensional code 30 itself (including the graphic encoded information 310), may be restored to the default shape (i.e., regular triangular shape). Then, the processor 13 may perform the angle restoring operation on the two-dimensional code 30 that is still in the skewed state as shown in FIG. 3F. For example, in the angle restoring operation, the processor 13 may obtain a rotation offset angle (i.e., the second rotation offset angle) of the two-dimensional code 30 relative to Z-axis (i.e., the second coordinate axis) in accordance with the position of the position mark 32 in the two-dimensional code 30. For example, the processor 13 may adopt phase correlation to obtain the second rotation offset angle in accordance with the position of the position mark 32 in the two-dimensional code 30. The second rotation offset angle may indicate the degrees by which the two-dimensional code 30 in the default shape that is a regular triangular shape as shown in FIG. 3A is rotated using Z-axis as the rotation axis in the three-dimensional space to rotate the position mark 32 in the two-dimensional code 30 to the position of the position mark 32 in FIG. 3F. Then, the processor 13 may correct (e.g., rotate) the two-dimensional code 30 in accordance with a rotation matrix corresponding to the second rotation offset angle to restore the position mark 32 to the default position in FIG. 3A. It should be noted that the operation of restoring the position mark 32 to the default position may be equivalent to restoring (rotating, for example) the two-dimensional code 30 in the skewed state to the default angle state of the two-dimensional code 30, as shown in FIG. 3A. So far, the correction (or restoring) of the two-dimensional code 30 (including the graphic encoded information 310) having the outer frame in the odd-numbered regular polygonal shape (e.g., a regular triangular shape) is completed. Then, the processor 13 as shown in FIG. 1 may analyze (e.g., decode) the graphic encoded information 310 carried or presented by the corrected two-dimensional code 30 and perform the default operation in accordance with the analysis result.

The following describes the correction of the two-dimensional code with an even-numbered regular polygonal outer frame.

Figure 4A:
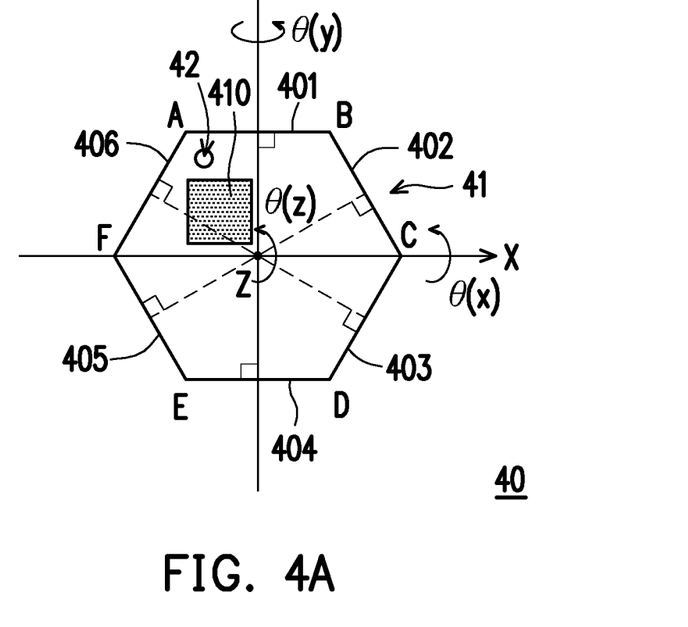
FIG. 4A is a schematic view illustrating a two-dimensional code in a default state according to an embodiment of the disclosure.

Referring to FIG. 4A, the two-dimensional code 40 has an outer frame 41 and a position mark 42. In the default state of the two-dimensional code 40, the default shape of the outer frame 41 is regular hexagonal, and the mark position 42 is located at the default position. For example, the outer frame 41 may have sides 401 to 406 and vertexes A to F. The sides 401 to 406 form a regular hexagon, and the vertexes A to F are respectively the six vertexes of the regular hexagon. It should be noted that the default shape of the outer frame 41 may also be other even-numbered regular polygonal shapes, and/or the default position of the position mark 42 may also be adjusted based on practice. The disclosure is not particularly limited in this regard. In addition, graphic encoded information 410 carried by the two-dimensional code 40 may be presented in a regular hexagonal area surrounded by the outer frame 41, and the disclosure is not particularly limited by the default position of the graphic encoded information 410 in the two-dimensional code 40 and the contents of the graphic encoded information 410.

Figure 4B:
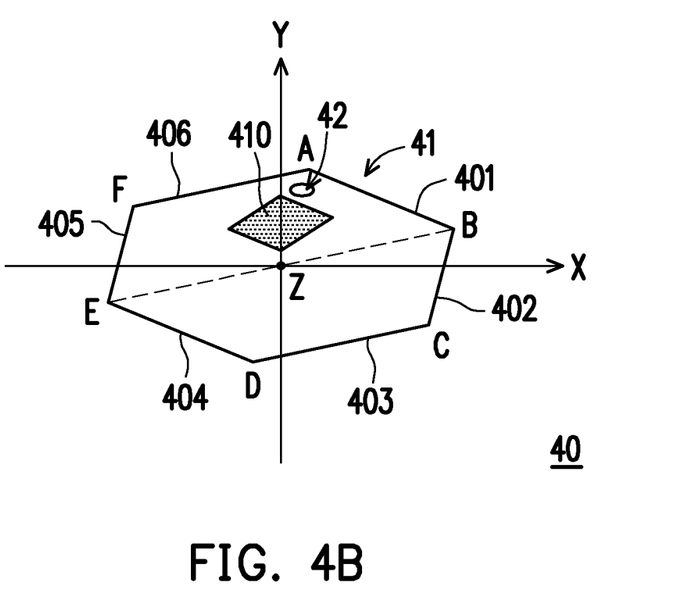
FIG. 4B is a schematic view illustrating the two-dimensional code in a skewed state according to an embodiment of the disclosure.

Referring to FIG. 4B, it is assumed that the two-dimensional code 40 is in the skewed state. For example, the two-dimensional code 40 in the skewed state as shown in FIG. 4B may be obtained by rotating the two-dimensional code 40 in the default state as shown in FIG. 4A by θ(x) degrees, θ(y) degrees, and θ(z) degrees using X-axis, Y-axis, and Z-axis in the three-dimensional space as the rotation axes. In addition, the graphic encoded information 410 in FIG. 4B is also in a skewed and/or distorted state.

Figure 4C:
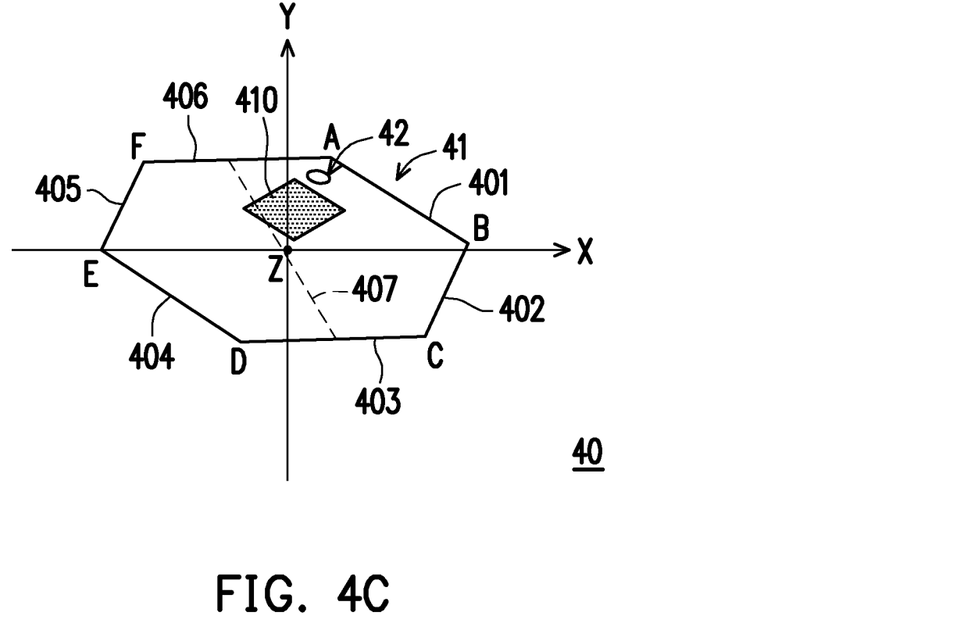
FIGS. 4C to 4F are schematic views illustrating correcting the two-dimensional code in the skewed state according to an embodiment of the disclosure.

In an embodiment, the processor 13 may detect the outer frame 41 and the position mark 42 of the two-dimensional code 40 in the skewed state as shown in FIG. 4B. In accordance with the detected outer frame 41, the processor 13 may perform the preliminary correction operation on the two-dimensional code 40 in the skewed state. In the preliminary correction operation, the processor 13 may rotate the two-dimensional code 40, so that the side 403 of the outer frame 41 of the two-dimensional code 40 is parallel to X-axis (i.e., the second coordinate axis), as shown in FIG. 4C. In addition, the processor 13 may obtain or establish a line 407 connecting the side 403 and the side 406. The side 403 is opposite to the side 406.

Figure 4D:
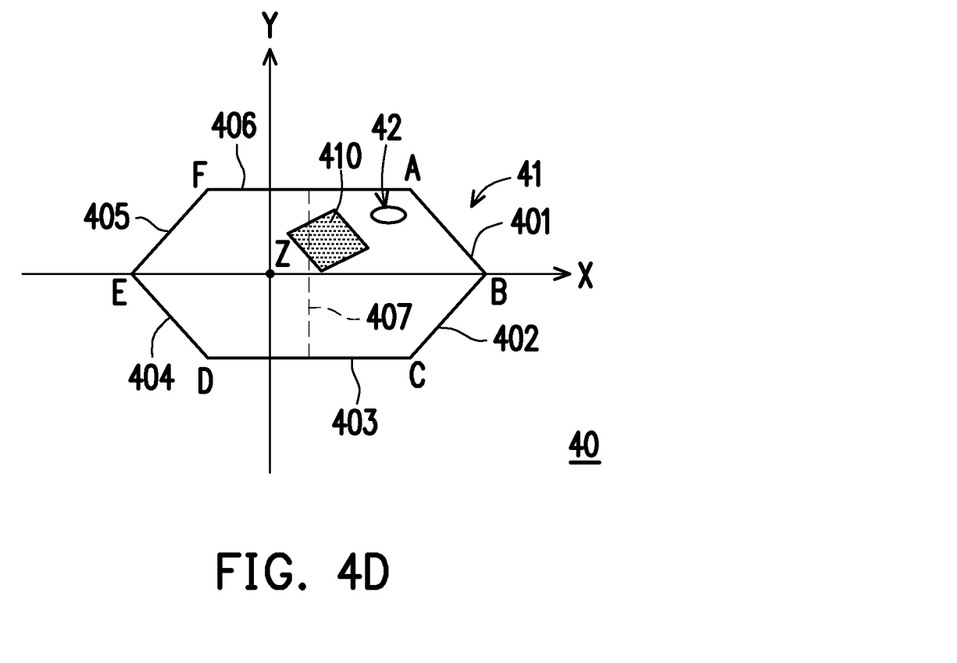

Referring to FIG. 4D following FIG. 4C, in the preliminary correction operation, the processor 13 may further move at least a portion of the pattern of the two-dimensional code 40 in a direction parallel to X-axis, so that the line 407 is parallel to Y-axis (i.e., the third coordinate axis). Then, the processor 13 may further move the entire two-dimensional code 40 in a direction parallel to X-axis, so that the line 407 is aligned to Y-axis (i.e., allowing the line 407 to coincide or be overlapped with Y-axis), as shown in FIG. 4E.

Figure 4E:
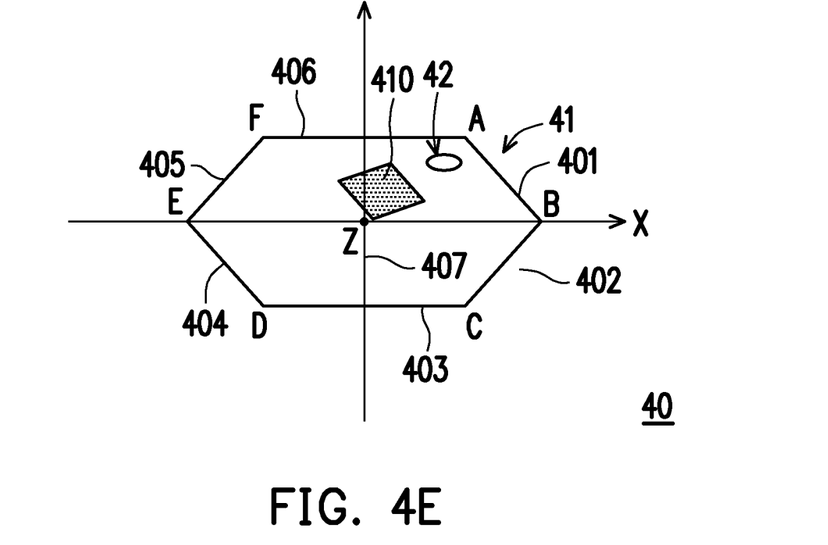

In FIG. 4E, the two-dimensional code 40 is still in the skewed state. For example, in FIG. 4E, the two-dimensional code 40 is in a squeezed hexagonal shape, instead of a regular hexagonal shape. Therefore, in FIG. 4E, the processor 13 may perform the shape restoring operation on the two-dimensional code 40 in the skewed state. For example, in the shape restoring operation, the processor 13 may obtain descriptive data relating to the shape of the outer frame 41 in the skewed state. For example, the descriptive data may include the first reference value and the second reference value. For example, the first reference value may correspond to the distance (i.e., the length of the line 407) between the side 403 (i.e., the first side) and the side 406 (i.e., the second side), and the second reference value may correspond to the length of the side 403. Alternatively, in an embodiment, the second reference value may also correspond to the distance between the vertex B and the vertex E. In addition, the first reference value and the second reference value may schematically indicate the deformation of the outer frame 41 in the skewed state. For example, the first reference value and the second reference value may indicate the schematic mode of the squeezed hexagon presented when the outer frame 41 is in the skewed state.

In an embodiment, in accordance with the first reference value and the second reference value, the processor 13 may obtain the rotation offset angle (i.e., the first rotation offset angle) of the two-dimensional code 40 in the skewed state relative to X-axis (i.e., the first coordinate axis). The first rotation offset angle may indicate the degrees by which the outer frame 41 in the regular hexagonal shape in the default state as shown in FIG. 4A is rotated using X-axis as the rotation axis in the three-dimensional space to obtain the outer frame 41 in the squeezed hexagonal shape as shown in FIG. 4E.

In an embodiment, the processor 13 may refer to a value ratio between the first reference value and the second reference value (e.g., the value ratio between the length of the line 407 and the length of the side 403) to obtain the first rotation offset angle through calculation or by using a lookup table. Then, the processor 13 may correct the two-dimensional code 40 in the skewed state in FIG. 4E by using a rotation matrix corresponding to the first rotation offset angle.

Figure 4F:
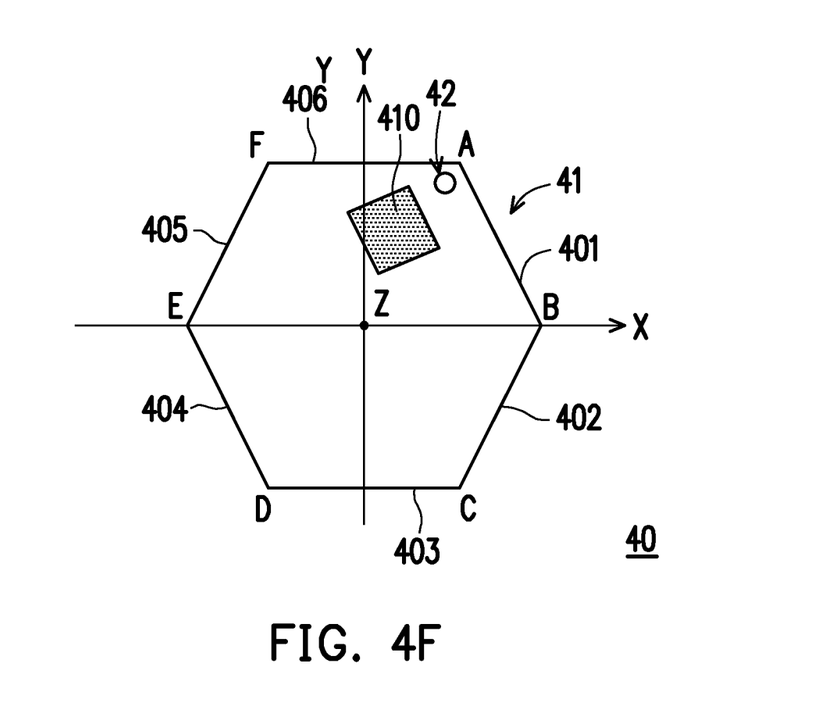

Referring to FIG. 4F, after correcting the two-dimensional code 40 in the skewed state as shown in FIG. 4E in accordance with the rotation matrix corresponding to the first rotation offset angle, the outer frame 41 of the two-dimensional code 40, together with the two-dimensional code 40 itself (including the graphic encoded information 410), may be restored to the default shape (i.e., regular hexagonal shape). Then, the processor 13 may perform the angle restoring operation on the two-dimensional code 40 that is still in the skewed state as shown in FIG. 4F. For example, in the angle restoring operation, the processor 13 may obtain a rotation offset angle (i.e., the second rotation offset angle) of the two-dimensional code 40 relative to Z-axis (i.e., the second coordinate axis) in accordance with the position of the position mark 42 in the two-dimensional code 40. For example, the processor 13 may adopt phase correlation to obtain the second rotation offset angle in accordance with the position of the position mark 42 in the two-dimensional code 40. The second rotation offset angle may indicate the degrees by which the two-dimensional code 40 in the default shape that is a regular hexagonal shape as shown in FIG. 4A is rotated using Z-axis as the rotation axis in the three-dimensional space to rotate the position mark 42 in the two-dimensional code 40 to the position of the position mark 42 in FIG. 4F Then, the processor 13 may correct (e.g., rotate) the two-dimensional code 40 in accordance with a rotation matrix corresponding to the second rotation offset angle to restore the position mark 42 to the default position in FIG. 4A. It should be noted that the operation of restoring the position mark 42 to the default position may be equivalent to restoring (rotating, for example) the two-dimensional code 40 in the skewed state to the default angle state of the two-dimensional code 40, as shown in FIG. 4A. Then (or after restoration), the processor 13 as shown in FIG. 1 may analyze (e.g., decode) the graphic encoded information 410 carried or presented by the corrected two-dimensional code 40 and perform the default operation in accordance with the analysis result.

It should be noted that, in the above embodiments, a regular triangular shape and a regular hexagonal shape are respectively used as examples of the odd-numbered polygonal shape and the even-numbered polygonal shape. However, the disclosure is not limited thereto. In other embodiments, other types of odd-numbered polygonal shapes or even-numbered polygonal shapes may also be chosen as the default shape of the outer frame of the two-dimensional code. Besides, when other types of odd-numbered polygonal shapes or even-numbered polygonal shapes are adopted as the outer frame of the two-dimensional code, the two-dimensional code may also be corrected based on corresponding operational logics. Thus, details of relevant operations have been set forth above and will not be repeated in the following.

Figure 5:
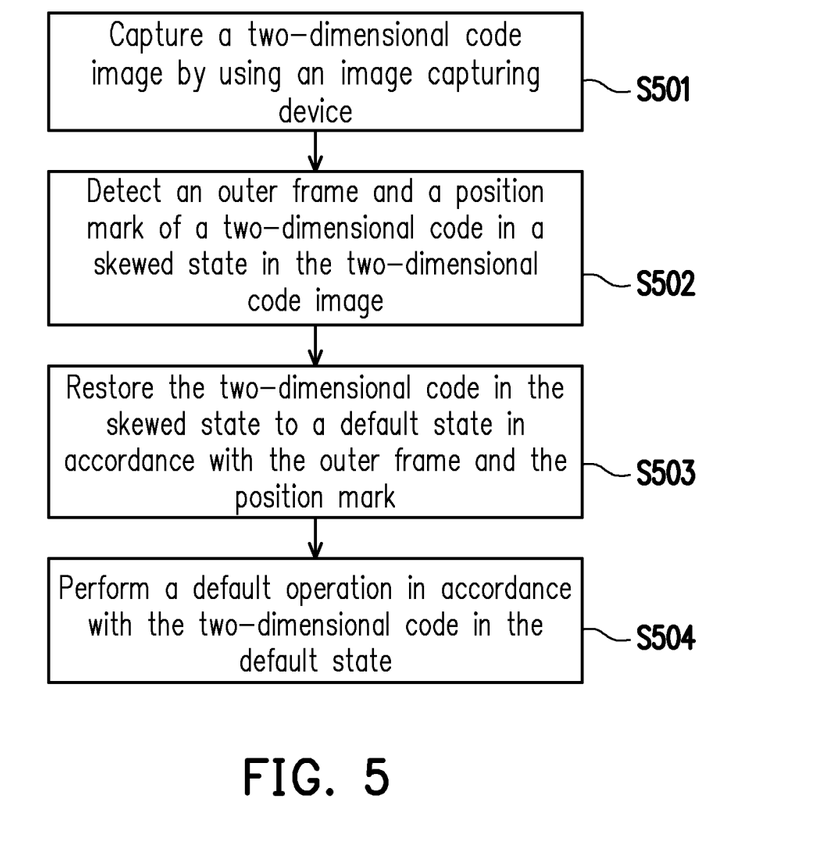
FIG. 5 is a flowchart illustrating a reading method for a two-dimensional code according to an embodiment of the disclosure.

Referring to FIG. 5, in Step S501, a two-dimensional code image is captured by using an image capturing device, and the two-dimensional code image presents a two-dimensional code in a skewed state. In Step S502, an outer frame and a position mark of the two-dimensional code in the skewed state in the two-dimensional code image are detected. In Step S503, the two-dimensional code in the skewed state is restored to a default state in accordance with the outer frame and the position mark. In Step S504, a default operation is performed in accordance with the two-dimensional code in the default state.

Details of the respective steps in FIG. 5 have been set forth above and therefore will not be repeated in the following. It should be noted that the respective steps in FIG. 5 may be implemented as multiple programming codes or circuits. The disclosure is not particularly limited in this regard. In addition, the method in FIG. 5 may be used together with the above embodiments or used alone. The disclosure is not particularly limited in this regard.

In view of the foregoing, even if the two-dimensional code captured by the user is in a skewed state, the two-dimensional code (including the graphic encoded information in the two-dimensional code) may also be restored to the default state by using the outer frame and the position mark that hardly take up any space of the code layout area inside the two-dimensional code. Then, the default operation may be performed automatically in accordance with the two-dimensional code (i.e., the graphic encoded information) in the default state. Compared with the conventional coding/decoding techniques for two-dimensional codes, the reading method and the reading device for the two-dimensional code according to the embodiments of the disclosure are capable of effectively facilitating the efficiency in using the two-dimensional code.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A reading method for a two-dimensional code, comprising:
   capturing a two-dimensional code image by using an image capturing device, wherein the two-dimensional code image presents a two-dimensional code in a skewed state;
   detecting an outer frame and a position mark of the two-dimensional code in the skewed state in the two-dimensional code image;
   restoring the two-dimensional code in the skewed state to a default state in accordance with the outer frame and the position mark; and
   performing a default operation in accordance with the two-dimensional code in the default state.

2. The reading method for the two-dimensional code as claimed in claim 1, wherein there is only one position mark.

3. The reading method for the two-dimensional code as claimed in claim 1, wherein a shape of the outer frame is one of a circular shape, an odd-numbered regular polygonal shape, and an even-numbered regular polygonal shape.

4. The reading method for the two-dimensional code as claimed in claim 1, wherein restoring the two-dimensional code in the skewed state to the default state in accordance with the outer frame and the position mark comprises:
   performing a shape restoring operation on the two-dimensional code, the shape restoring operation comprising:
      obtaining descriptive data relating to a shape of the outer frame in the skewed state;
      obtaining a first rotation offset angle of the two-dimensional code relative to a first coordinate axis in accordance with the descriptive data; and
      correcting the two-dimensional code in accordance with the first rotation offset angle to restore the outer frame to a default shape.

5. The reading method for the two-dimensional code as claimed in claim 4, wherein the descriptive data comprises a first reference value and a second reference value,
   when the default shape of the outer frame is circular, the first reference value corresponds to a major axis length of the outer frame, and the second reference value corresponds to a minor axis length of the outer frame,
   when the default shape of the outer frame is odd-numbered regular polygonal, the first reference value corresponds to a distance between a vertex of the outer frame and a side opposite to the vertex, and the second reference value corresponds to a length of the side, and
   when the default shape of the outer frame is even-numbered regular polygonal, the first reference value corresponds to a distance between a first side of the outer frame and a second side opposite to the first side, and the second reference value corresponds to a length of the second side.

6. The reading method for the two-dimensional code as claimed in claim 5, wherein the shape restoring operation further comprises:
   obtaining the first rotation offset angle in accordance with a value ratio between the first reference value and the second reference value.

7. The reading method for the two-dimensional code as claimed in claim 4, wherein restoring the two-dimensional code in the skewed state to the default state in accordance with the outer frame and the position mark further comprises:
   performing a preliminary correction operation on the two-dimensional code before performing the shape restoring operation on the two-dimensional code when the default shape of the outer frame is odd-numbered regular polygonal or even-numbered regular polygonal, the preliminary correction operation comprising:
      rotating the two-dimensional code, so that a side of the outer frame is parallel to a coordinate axis.

8. The reading method for the two-dimensional code as claimed in claim 7, wherein the preliminary correction operation further comprises:
   in a state in which the side of the outer frame is parallel to the coordinate axis, moving at least a portion of a pattern of the two-dimensional code in a direction parallel to the coordinate axis, so that a line connecting the side and a vertex of the outer frame is parallel to a third coordinate axis.

9. The reading method for the two-dimensional code as claimed in claim 1, wherein restoring the two-dimensional code in the skewed state to the default state in accordance with the outer frame and the position mark comprises:
   performing an angle restoring operation on the two-dimensional code, the angle restoring operation comprising:
      obtaining a rotation offset angle of the two-dimensional code relative to a coordinate axis in accordance with a position of the position mark; and
      correcting the two-dimensional code in accordance with the rotation offset angle to restore the position mark to a default position.

10. A reading device for a two-dimensional code, comprising:
    an image capturing device, configured to capture a two-dimensional code image, wherein the two-dimensional code image presents a two-dimensional code in a skewed state;
    a storage circuit, configured to store the two-dimensional code image; and
    a processor, coupled to the image capturing device and the storage circuit,
    wherein the processor is configured to:
       detect an outer frame and a position mark of the two-dimensional code in the skewed state in the two-dimensional code image;
       restore the two-dimensional code in the skewed state to a default state in accordance with the outer frame and the position mark; and
       perform a default operation in accordance with the two-dimensional code in the default state.

11. The reading device for the two-dimensional code as claimed in claim 10, wherein there is only one position mark.

12. The reading device for the two-dimensional code as claimed in claim 10, wherein a shape of the outer frame is one of a circular shape, an odd-numbered regular polygonal shape, and an even-numbered regular polygonal shape.

13. The reading device for the two-dimensional code as claimed in claim 10, wherein an operation of restoring the two-dimensional code in the skewed state to the default state in accordance with the outer frame and the position mark comprises:
  performing a shape restoring operation on the two-dimensional code, the shape restoring operation comprising:
    obtaining descriptive data relating to a shape of the outer frame in the skewed state;
    obtaining a first rotation offset angle of the two-dimensional code relative to a first coordinate axis in accordance with the descriptive data; and
    correcting the two-dimensional code in accordance with the first rotation offset angle to restore the outer frame to a default shape.

14. The reading device for the two-dimensional code as claimed in claim 13, wherein the descriptive data comprises a first reference value and a second reference value,
  when the default shape of the outer frame is circular, the first reference value corresponds to a major axis length of the outer frame, and the second reference value corresponds to a minor axis length of the outer frame,
  when the default shape of the outer frame is odd-numbered regular polygonal, the first reference value corresponds to a distance between a vertex of the outer frame and a side opposite to the vertex, and the second reference value corresponds to a length of the side, and
  when the default shape of the outer frame is even-numbered regular polygonal, the first reference value corresponds to a distance between a first side of the outer frame and a second side opposite to the first side, and the second reference value corresponds to a length of the second side.

15. The reading device for the two-dimensional code as claimed in claim 14, wherein the shape restoring operation further comprises:
  obtaining the first rotation offset angle in accordance with a value ratio between the first reference value and the second reference value.

16. The reading device for the two-dimensional code as claimed in claim 13, wherein the operation of restoring the two-dimensional code in the skewed state to the default state in accordance with the outer frame and the position mark further comprises:
  performing a preliminary correction operation on the two-dimensional code before performing the shape restoring operation on the two-dimensional code when the default shape of the outer frame is odd-numbered regular polygonal or even-numbered regular polygonal, the preliminary correction operation comprising:
  rotating the two-dimensional code, so that a side of the outer frame is parallel to a coordinate axis.

17. The reading device for the two-dimensional code as claimed in claim 16, wherein the preliminary correction operation further comprises:
  in a state in which the side of the outer frame is parallel to the coordinate axis, moving at least a portion of a pattern of the two-dimensional code in a direction parallel to the coordinate axis, so that a line connecting the side and a vertex of the outer frame is parallel to a third coordinate axis.

18. The reading device for the two-dimensional code as claimed in claim 10, wherein an operation of restoring the two-dimensional code in the skewed state to the default state in accordance with the outer frame and the position mark comprises:
  performing an angle restoring operation on the two-dimensional code, the angle restoring operation comprising:
    obtaining a rotation offset angle of the two-dimensional code relative to a coordinate axis in accordance with a position of the position mark; and
    correcting the two-dimensional code in accordance with the rotation offset angle to restore the position mark to a default position.

* * * * *